United States Patent
Hino et al.

(10) Patent No.: US 10,414,133 B2
(45) Date of Patent: Sep. 17, 2019

(54) SYNTHETIC RESIN LAMINATE

(71) Applicants: MITSUBISHI GAS CHEMICAL COMPANY, INC., Tokyo (JP); MGC FILSHEET CO., LTD., Saitama (JP)

(72) Inventors: Kosei Hino, Kanagawa (JP); Takeshi Onishi, Tokyo (JP); Osamu Kakinoki, Tokyo (JP); Hidetaka Shimizu, Ibaraki (JP); Hirohiko Aikawa, Ibaraki (JP); Toshinari Aoki, Osaka (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 322 days.

(21) Appl. No.: 14/399,705

(22) PCT Filed: May 15, 2013

(86) PCT No.: PCT/JP2013/063548
§ 371 (c)(1),
(2) Date: Nov. 7, 2014

(87) PCT Pub. No.: WO2013/172381
PCT Pub. Date: Nov. 21, 2013

(65) Prior Publication Data
US 2015/0111015 A1   Apr. 23, 2015

(30) Foreign Application Priority Data
May 18, 2012  (JP) .................. 2012-114271

(51) Int. Cl.
B32B 27/08 (2006.01)
B32B 27/36 (2006.01)
C08L 69/00 (2006.01)
B32B 27/30 (2006.01)

(52) U.S. Cl.
CPC ............ B32B 27/08 (2013.01); B32B 27/308 (2013.01); B32B 27/36 (2013.01); B32B 27/365 (2013.01); C08L 69/00 (2013.01); B32B 2250/02 (2013.01); B32B 2250/03 (2013.01); B32B 2250/24 (2013.01); B32B 2250/244 (2013.01); B32B 2270/00 (2013.01); B32B 2307/306 (2013.01); B32B 2307/412 (2013.01); B32B 2307/536 (2013.01); B32B 2307/558 (2013.01); B32B 2307/584 (2013.01); B32B 2307/71 (2013.01); B32B 2307/734 (2013.01); B32B 2333/12 (2013.01); B32B 2369/00 (2013.01); Y10T 428/2495 (2015.01); Y10T 428/24967 (2015.01); Y10T 428/31507 (2015.04)

(58) Field of Classification Search
CPC ......... B32B 27/08; B32B 27/30; B32B 27/36; B32B 27/365; B32B 2250/02; B32B 2250/03; B32B 2250/244; B32B 2307/306; B32B 2307/412; B32B 2307/536; B32B 2307/558; B32B 2307/734; B32B 2333/12; B32B 2369/00; C08L 69/00; C08L 33/06
USPC ........................................ 428/213, 215, 412
See application file for complete search history.

(56) References Cited

U.S. PATENT DOCUMENTS

| | | | |
|---|---|---|---|
| 2003/0004256 A1* | 1/2003 | Ogasawara et al. .......... 524/495 |
| 2007/0009741 A1 | 1/2007 | Boven et al. | |
| 2009/0030129 A1* | 1/2009 | Chakravarti et al. ......... 524/413 |
| 2009/0142537 A1* | 6/2009 | Hong ...................... C08L 33/10 428/64.7 |
| 2009/0263663 A1* | 10/2009 | Ogawa et al. ................ 428/412 |
| 2010/0121018 A1 | 5/2010 | Yoshida et al. | |
| 2010/0152357 A1* | 6/2010 | Kwon et al. ................... 524/502 |
| 2011/0086227 A1* | 4/2011 | Minemura et al. ........... 428/412 |
| 2011/0244242 A1* | 10/2011 | Oguro ...................... B32B 7/12 428/412 |
| 2012/0183780 A1 | 7/2012 | Ogawa et al. | |

FOREIGN PATENT DOCUMENTS

| | | |
|---|---|---|
| CN | 101454210 A | 6/2009 |
| CN | 101522415 A | 9/2009 |
| CN | 101679623 A | 3/2010 |
| CN | 102137756 A | 7/2011 |

(Continued)

OTHER PUBLICATIONS

Search report from PCT/JP2013/063548, dated Aug. 13, 2013.
Chinese Office Action issued with respect to application No. 201380022307.5, dated Sep. 6, 2015.

*Primary Examiner* — Maria V Ewald
*Assistant Examiner* — Ethan Weydemeyer
(74) *Attorney, Agent, or Firm* — Greenblum & Bernstein, P.L.C.

(57) ABSTRACT

A synthetic resin laminate is excellent in shape stability in high-temperature high-humidity environments and in surface hardness and usable for a transparent substrate material or protection material. A synthetic resin laminate includes a substrate layer containing a polycarbonate (B); and a resin layer laminated on one or both surfaces of the substrate layer, the resin layer containing a resin (A) that contains a (meth)acrylate copolymer (a1) and a polycarbonate (a2); wherein (a1) is a (meth)acrylate copolymer composed of 5 to 80% by mass of an aromatic (meth)acrylate unit (a11) and 20 to 95% by mass of a methyl methacrylate unit (a12); (a2) is a polycarbonate containing a constituent unit represented by formula [1]; and the ratio of (a1) with respect to the resin (A) is 5 to 55% by mass, and the ratio of (a2) with respect to the resin (A) is 95 to 45% by mass.

10 Claims, No Drawings

(56) References Cited

FOREIGN PATENT DOCUMENTS

| | | | |
|---|---|---|---|
| JP | 2000081758 A | * | 3/2000 |
| JP | 2001-234083 | | 8/2001 |
| JP | 2006-103169 | | 4/2006 |
| JP | 2009-500195 | | 1/2009 |
| JP | 2009-256408 | | 11/2009 |
| JP | 2010-167659 | | 8/2010 |
| JP | 2010-188719 | | 9/2010 |
| WO | 2008/047940 A1 | | 4/2008 |
| WO | 2009/116361 | | 9/2009 |

* cited by examiner

SYNTHETIC RESIN LAMINATE

TECHNICAL FIELD

The present invention relates to a synthetic resin laminate, and more specifically, to a synthetic resin laminate which is used for a transparent substrate material or protection material, which includes a polycarbonate substrate layer and a resin layer (high hardness layer) containing a specific (meth) acrylate copolymer resin and a specific polycarbonate resin, and which are excellent in shape stability in high-temperature high-humidity environments, surface hardness and/or impact resistance.

BACKGROUND ART

A polycarbonate resin plate is excellent in transparency, impact resistance and heat resistance, and is used for soundproof walls, carports, signboards, glazing materials, illumination devices and the like. However, a polycarbonate resin plate has a disadvantage of having a low surface hardness and is easy to be scratched, and thus the use thereof is limited.

In order to overcome the disadvantage, Patent Document 1 proposes a method of coating a surface of a polycarbonate resin plate with an ultraviolet-curable resin or the like, and a method of hard-coating a substrate obtained as a result of coextrusion of a polycarbonate resin and an acrylic resin.

However, a surface of a polycarbonate resin that is merely hard-coated does not have a required pencil hardness and is not usable for uses which require a certain level of surface hardness.

A method of coating a surface layer with an acrylic resin provides a surface hardness increased to some extent, and the resultant polycarbonate resin plate is usable for a wider range of uses including a front plate of an information display device and the like. However, the layer obtained by this method has a two-layer structure of different materials and may be warped when the environment is changed due to a difference in water absorption characteristic between the acrylic resin and the polycarbonate resin. Such a layer causes a flaw in a use in which an environmental change is involved.

As a laminate that is suppressed in warping, there is a laminate including acrylic resin layers provided on both of two surfaces of a polycarbonate resin layer. However, when a planar impact is applied to one of the surfaces of the laminate, the acrylic resin layer on the other surface of the laminate is easily cracked. This may cause a problem in a certain type of use.

As a laminate that is suppressed in warping, Patent Document 2 discloses a laminate including a metal methacrylate-styrene copolymer, which is a resin having a lower water absorption ratio than that of the acrylic resin, laminated on a polycarbonate resin. However, the conditions of 40° C./90% used in the environmental test are insufficient as high-temperature high-humidity conditions.

Patent Document 3 discloses a laminate including a highly hard denatured polycarbonate resin laminated on a polycarbonate resin, but does not refer to the water absorption characteristic or the shape stability against an environmental change.

Patent Document 4 discloses a laminate including a highly hard denatured polycarbonate resin different from that of Patent Document 3 laminated on a polycarbonate resin.

PRIOR ART DOCUMENTS

Patent Documents

Patent Document 1: Japanese Laid-Open Patent Publication No. 2006-103169
Patent Document 2: Japanese Laid-Open Patent Publication No. 2010-167659
Patent Document 3: Japanese PCT National-Phase Laid-Open Patent Publication No. 2009-500195
Patent Document 4: Japanese Laid-Open Patent Publication No. 2010-188719

DISCLOSURE OF THE INVENTION

Problems to be Solved by the Invention

The present invention has an object of providing a synthetic resin laminate that is excellent in shape stability in high-temperature high-humidity environments and in surface hardness and usable for a transparent substrate material or protection material.

Means for Solving the Problems

As a result of accumulating active studies in order to solve the above-described problems, the present inventors found that a synthetic resin laminate that is excellent in shape stability in high-temperature high-humidity environments and in surface hardness is obtained by laminating a resin containing a specific (meth)acrylate copolymer and a specific polycarbonate resin on one or both of two surfaces of a polycarbonate substrate layer, and thus achieved the present invention.

Namely, the present invention provides a synthetic resin laminate and a transparent material including the synthetic resin laminate described below.

<1> A synthetic resin laminate, which is obtained by laminating a resin layer containing a resin (A) that contains a (meth)acrylate copolymer (a1) and a polycarbonate (a2) on one surface or both surfaces of a substrate layer containing a polycarbonate (B), wherein (a1) is a (meth)acrylate copolymer composed of 5 to 80% by mass of an aromatic (meth)acrylate unit (a11) and 20 to 95% by mass of a methyl methacrylate unit (a12), (a2) is a polycarbonate containing a constituent unit represented by the following formula [1]:

[Chemical formula 1]

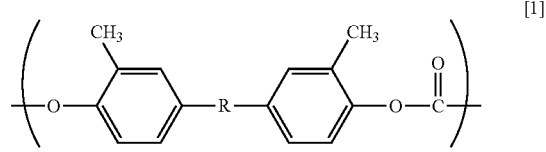

(in formula [1], R represents a single bond, an alkylene group having 1 to 6 carbon atoms, an arylene group having 6 to 10 carbon atoms, or a cyclic alkylene group having 3 to 8 carbon atoms), and the ratio of (a1) with respect to the resin (A) is 5 to 55% by mass, and the ratio of (a2) with respect to the resin (A) is 95 to 45% by mass.

<2> The synthetic resin laminate according to <1> above, wherein the polycarbonate (a2) is a polycarbonate homopolymer or copolymer composed of 20 to 100% by mass of a constituent unit represented by the following formula [2]:

[Chemical formula 2]

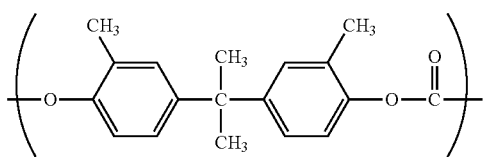

[2]

and 80 to 0% by mass of a constituent unit represented by the following formula [3]:

[Chemical formula 3]

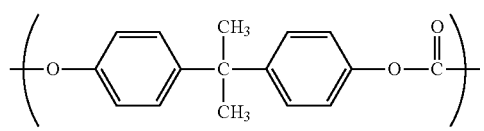

[3]

<3> The synthetic resin laminate according to <1> or <2> above, wherein the resin (A) is composed of 5 to 55% by mass of the (meth)acrylate copolymer (a1) having a weight-average molecular weight of 5,000 to 30,000 and 95 to 45% by mass of the polycarbonate (a2) having a weight-average molecular weight of 21,000 to 40,000.
<4> The synthetic resin laminate according to any one of <1> to <3> above, wherein the resin layer containing the resin (A) has a thickness of 10 to 250 μm, the synthetic resin laminate has a total thickness of 0.1 to 2.0 mm, and the thickness ratio of the resin layer/synthetic resin laminate is 0.01 to 0.5.
<5> The synthetic resin laminate according to any one of <1> to <4> above, wherein the polycarbonate (B) has a weight-average molecular weight of 18,000 to 40,000.
<6> The synthetic resin laminate according to any one of <1> to <5> above, wherein the resin layer and/or the substrate layer contains an ultraviolet absorber.
<7> The synthetic resin laminate according to any one of <1> to <6> above, wherein the resin layer containing the resin (A) is hard-coated.
<8> The synthetic resin laminate according to any one of <1> to <6> above, wherein the resin layer containing the resin (A) is provided on only one surface of the substrate layer containing the polycarbonate (B), and the resin layer containing the resin (A) and the substrate layer containing the polycarbonate (B) are hard-coated.
<9> The synthetic resin laminate according to any one of <1> to <8> above, wherein one surface or both surfaces of the synthetic resin laminate is obtained as a result of at least one of a reflection preventive treatment, an antifouling treatment, an anti-fingerprint treatment, an antistatic treatment, a climate-proof treatment, and an anti-glare treatment.
<10> A transparent substrate material, comprising the synthetic resin laminate according to any one of <1> to <9> above.
<11> A transparent protection material, comprising the synthetic resin laminate according to any one of <1> to <9> above.

Advantageous Effect of the Invention

The present invention provides a synthetic resin laminate that is excellent in shape stability in high-temperature high-humidity environments in surface hardness and/or impact resistance, and such a synthetic resin laminate is used for a transparent substrate material or a transparent protection material. Specifically, the synthetic resin laminate is preferably used for, for example, mobile display devices including mobile phone terminals, mobile electronic gadgets, mobile information terminals, mobile PCs and the like; and installation-type display devices including notebook PCs, desktop PCs, liquid crystal monitors, liquid crystal TVs and the like.

Embodiments for Carrying Out the Invention

Hereinafter, the present invention will be described in detail by way of production examples, examples and the like, but the present invention is not limited to the following production examples, examples or the like, and may be modified in any way without significantly departing from the gist thereof.

The present invention is directed to a synthetic resin laminate, comprising:
a substrate layer containing a polycarbonate (B); and
a resin layer laminated on one surface or both surfaces of the substrate layer, the resin layer containing a resin (A) that contains a (meth)acrylate copolymer (a1) and a polycarbonate (a2),
wherein:
(a1) is a (meth)acrylate copolymer composed of 5 to 80% by mass of an aromatic (meth)acrylate unit (a11) and 20 to 95% by mass of a methyl methacrylate unit (a12),
(a2) is a polycarbonate containing a constituent unit represented by the following formula [1]:

[Chemical formula 1]

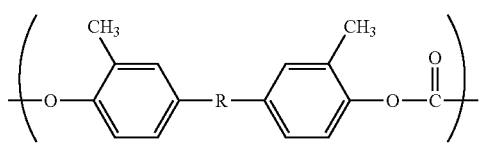

[1]

(in formula [1], R represents a single bond, an alkylene group having 1 to 6 carbon atoms, an arylene group having 6 to 10 carbon atoms, or a cyclic alkylene group having 3 to 8 carbon atoms), and
the ratio of (a1) with respect to the resin (A) is 5 to 55% by mass, and the ratio of (a2) with respect to the resin (A) is 95 to 45% by mass.
<Meth(Acrylate) Copolymer (a1)>
(a1) used in the laminate according to the present invention is a (meth)acrylate copolymer composed of 5 to 80% by mass of the aromatic (meth)acrylate unit (a11) and 20 to 95% by mass of the methyl methacrylate unit (a12).

The aromatic (meth)acrylate is a (meth)acrylate containing an aromatic group in an ester moiety thereof. Examples of the aromatic (meth)acrylate include phenyl (meth)acrylate and benzyl (meth)acrylate. These materials may be used independently or in a combination of two or more. Among these materials, phenyl methacrylate and benzyl methacrylate are preferable. Phenyl methacrylate is more preferable. The presence of the aromatic (meth)acrylate unit (a11) can increase the transparency of a molded body containing a mixture of the aromatic (meth)acrylate unit (a11) and an aromatic polycarbonate resin.

The methyl methacrylate unit (a12) has a property of being sufficiently dispersed with a polycarbonate-based resin and transferring to a surface of the molded body, and thus can increase the surface hardness of the molded body.

The (meth)acrylate copolymer (a1) used in the present invention contains (a11) and (a12) at a mass ratio (a11/a12) of 5-80/20-95. Where the content of the aromatic (meth) acrylate unit (a11) in (a1) is 5% by mass or greater, an area having a high content of (a1) maintains transparency. Where the content of the aromatic (meth)acrylate unit (a11) in (a1) is 80% by mass or less, the compatibility of the aromatic (meth)acrylate unit (a11) with an aromatic polycarbonate is not too high and thus the transferability to the surface of the molded body is not decreased. Therefore, the surface hardness is not decreased.

The weight-average molecular weight of the (meth)acrylate copolymer (a1) is preferably 5,000 to 30,000, and is more preferably 10,000 to 25,000. Where the weight-average molecular weight is 5,000 to 30,000, the (meth)acrylate copolymer (a1) has good compatibility with an aromatic polycarbonate and thus has a good effect of increasing the surface hardness. The weight-average molecular weight (Mw), the number-average molecular weight (Mn) and the molecular weight distribution (Mw/Mn) of (a1) can be measured by gel permeation chromatography by use of THF or chloroform as a solvent.

<Polycarbonate (a2)>

The polycarbonate (a2) used in the present invention is a polycarbonate containing the constituent unit represented by formula [1] above, and may be either a homopolymer or a copolymer as long as being a polycarbonate containing the constituent unit represented by formula [1]. The copolymer may be either a copolymer containing only the constituent unit represented by formula [1] or a copolymer polycarbonate containing a constituent unit represented by formula [3] above in addition to the constituent unit represented by formula [1]. In the case where such a copolymer is used, it is preferable that the ratio of the constituent unit represented by formula [3] with respect to the entire copolymer is 80% by mass or less.

As the constituent unit represented by formula [1], a constituent unit represented by formula [2] below is especially preferable.

Namely, according to the present invention, it is preferable that the polycarbonate (a2) is a polycarbonate homopolymer or copolymer composed of 20 to 100% by mass of the constituent unit represented by the following formula [2]:

[Chemical formula 2]

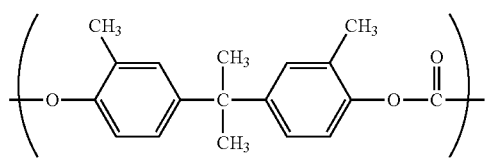

[2]

and 80 to 0% by mass of the constituent unit represented by the following formula [3]:

[Chemical formula 3]

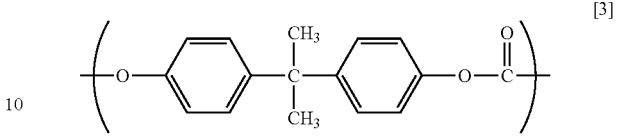

[3]

Preferably, the polycarbonate (a2) used in the present invention is a polycarbonate homopolymer or copolymer composed of 30 to 100% by mass of the constituent unit represented by formula [2] above and 70 to 0% by mass of the constituent unit represented by formula [3] above.

The polycarbonate containing the constituent unit represented by formula [1] above has a higher surface hardness than that of the polycarbonate containing the constituent unit represented by formula [3] above. Therefore, the resin (A) can have high surface hardness when the polycarbonate containing the constituent unit represented by formula [1] is used as the polycarbonate (a2).

According to the present invention, the weight-average molecular weight of the polycarbonate (a2) is determined based on ease of mixing (ease of dispersion) with the (meth)acrylate copolymer (a1) and ease of production of the resin (A). Namely, where the weight-average molecular weight of the polycarbonate (a2) is too large, the melt viscosity difference between (a1) and (a2) is too large and (a1) and (a2) are not mixed (dispersed) sufficiently. This causes a flaw that the transparency of the resin (A) is deteriorated or that the melding and kneading treatment cannot be performed stably. By contrast, where the weight-average molecular weight of the polycarbonate (a2) is too small, the strength of the resin (A) is decreased, which causes a problem that the impact resistance of the synthetic resin laminate is decreased. The weight-average molecular weight of the polycarbonate (a2) is preferably in the range of 21,000 to 40,000, more preferably 24,000 to 38,000, and still more preferably in the range of 27,000 to 36,000.

<Resin (A): Mixture of the (Meth)Acrylate Copolymer (a1) and the Polycarbonate (a2)>

According to the present invention, the composition ratio of the (meth)acrylate copolymer (a1) and the polycarbonate (a2) is 5 to 55% by mass of the (a1) component and 95 to 45% by mass of the component (a2). Preferably, the ratio is 20 to 50% by mass of the component (a1) and 80 to 50% by mass of the component (a2). Where the ratio is within such a range, the resin (A) maintains the transparency, and the various properties thereof including the surface hardness, the impact resistance and the water absorption ratio are well balanced.

<Polycarbonate (B)>

The polycarbonate (B) used in the present invention may be of any type, with no specific limitation, that includes an —[O—R—OCO]— unit (R represents an aliphatic group, an aromatic group, a material containing both of an aliphatic group and an aromatic group, or such a material having a straight chain structure or a branched structure) containing a carbonate ester bond in a molecular backbone thereof. Especially preferably, the polycarbonate contains the constituent unit represented by formula [3] above. Where such a polycarbonate is used, the resin laminate is excellent in impact resistance.

According to the present invention, the weight-average molecular weight of the polycarbonate (B) influences the impact resistance and the molding conditions of the synthetic resin laminate. Namely, where the weight-average molecular weight is too small, the impact resistance of the synthetic resin laminate is decreased, which is not preferable. Where the weight-average molecular weight is too large, an excessive heat source may occasionally be needed to laminate the resin layer containing the resin (A) (hereinafter, the resin layer containing the resin (A) will be occasionally referred to as the "high hardness layer"), which is not preferable. When a specific molding method is used, a high temperature is needed. In this case, the resin (A) is exposed to such a high temperature, which may adversely influence the heat stability thereof. The weight-average molecular weight of the polycarbonate (B) is preferably 18,000 to 40,000, more preferably 23,000 to 38,000, and still more preferably 27,000 to 36,000.

<Methods for Producing Various Materials>

There is no specific limitation on the method for producing the synthetic resin laminate according to the present invention. There are various methods including, for example, a method of laminating the high hardness layer and the substrate layer containing the polycarbonate (B) separately formed and pressure-contacting the layers by heating; a method of laminating the high hardness layer and the substrate layer separately formed and bonding the layers by an adhesive; a method of coextruding the resin (A) and the polycarbonate (B); and a method of integrating, by use of in-molding, the polycarbonate (B) with the high hardness layer formed in advance. From the points of view of production cost and productivity, the method of coextrusion is preferable.

A method for producing the polycarbonate (a2) and the polycarbonate (B) used in the present invention may be optionally selected from known methods including a phosgene method (interface polymerization method), a transesterification method (melting method) and the like in accordance with the monomer to be used.

According to the present invention, there is no specific limitation on the method for producing the resin (A). Any known method is applicable. For example, necessary components are mixed in advance by use of a mixer such as, for example, a tumbler, a Henschel mixer, a super mixer or the like, and then are melted and kneaded by use of a machine such as a banbury mixer, a roll, a brabender, a monoaxial extruder, a biaxial extruder, a pressurized kneader or the like.

<Resin Laminate>

According to the present invention, the thickness of the high hardness layer influences the surface hardness and the impact resistance of the synthetic resin laminate. Namely, where the high hardness layer is too thin, the surface hardness is decreased, which is not preferable. Where the high hardness layer is too thick, the impact resistance is decreased, which is not preferable. The thickness of the high hardness layer is preferably 10 to 250 μm, more preferably 30 to 200 μm, and still more preferably 60 to 100 μm.

According to the present invention, the total thickness of the synthetic resin laminate (sheet) influences the deforming amount (warping amount) of the synthetic resin laminate when the laminate is exposed to high-temperature high-humidity environments and also influences the impact resistance of the synthetic resin laminate. Namely, where the total thickness is too small, the deforming amount (warping amount) of the synthetic resin laminate when the laminate is exposed to high-temperature high-humidity environments is increased and the impact resistance is decreased. Where the total thickness is large, the deforming amount (warping amount) of the synthetic resin laminate when the laminate is exposed to high-temperature high-humidity environments is small and a certain level of impact resistance is guaranteed. However, where the total thickness is unnecessarily large, this means that an excessive amount of material is used for the substrate layer, which is not economical. The total thickness of the synthetic resin laminate is preferably 0.1 to 2.0 mm, more preferably 0.3 to 2.0 mm, and still more preferably 0.5 to 1.5 mm.

The ratio of the thickness of the resin layer (high hardness layer) containing the resin (A) with respect to the total thickness (X) of the synthetic resin laminate, namely, (A)/(X), influences the surface hardness and the impact resistance of the synthetic resin laminate. Namely, where the thickness ratio is too low, the surface hardness is decreased, which is not preferable. Where the thickness ratio is too high, the impact resistance is decreased, which is not preferable. The thickness ratio is preferably 0.01 to 0.5, more preferably 0.015 to 0.4, and still more preferably 0.02 to 0.3.

According to the present invention, the high hardness layer and/or the substrate layer may be mixed with an ultraviolet absorber for use. Where the content of the ultraviolet absorber is too low, the light resistance is insufficient. Where the content of the ultraviolet absorber is too high, an excessive amount of ultraviolet absorber may be scattered due to the high temperature and contaminate the molding environment to cause a flaw when a certain molding method is used. The content of the ultraviolet absorber is preferably 0 to 5% by mass, more preferably 0 to 3% by mass, and still more preferably 0 to 1% by mass. Usable as ultraviolet absorbers are, for example, benzophenone-based ultraviolet absorbers including 2,4-dihydroxybenzophenone, 2-hydroxy-4-methoxybenzophenone, 2-hydroxy-4-n-octoxybenzophenone, 2-hydroxy-4-dodecyloxybenzophenone, 2-hydroxy-4-octadecyloxybenzophenone, 2,2'-dihydroxy-4-methoxybenzophenone, 2,2'-dihydroxy-4,4'-dimethoxybenzophenone, 2,2',4,4'-tetrahydroxybenzophenone, and the like; benzotriazole-based ultraviolet absorbers including 2-(2-hydroxy-5-methylphenyl)benzotriazole, 2-(2-hydroxy-3,5-di-t-butylphenyl)benzotriazole, 2-(2-hydroxy-3-t-butyl-5-methylphenyl)benzotriazole, (2H-benzotriazole-2-yl)-4,6-bis(1-methyl-1-phenylethyl)phenol, and the like; benzoate-based ultraviolet absorbers including phenyl salicylate, 2,4-di-t-butylphenyl-3,5-di-t-butyl-4-hydroxybenzoate and the like; hindered amine-based ultraviolet absorbers including bis(2,2,6,6-tetramethylpiperidine-4-yl)sebacate and the like; and triazine-based ultraviolet absorbers including 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, and the like. There is no specific limitation on the method for mixing. Usable methods include a method of compounding the entire amounts, a method of dry-blending master batches, a method of dry-blending the entire amounts, and the like.

According to the present invention, the high hardness layer and/or the substrate layer may be mixed with any of various additives for use. Usable additives are, for example, antioxidants, anti-coloring agents, antistatic agents, releasing agents, lubricants, dyes, pigments, plasticizers, flame-retardants, resin modifiers, compatibilizers, and reinforcing agents such as organic fillers, inorganic fillers and the like. There is no specific limitation on the method for mixing. Usable methods include a method of compounding the entire amounts, a method of dry-blending master batches, a method of dry-blending the entire amounts, and the like.

According to the present invention, the hard-coating is performed by use of a hard-coat that cures a material by use of thermal energy and/or optical energy to form a hard-coat layer. Usable as hard-coats that cure a material by use of thermal energy are, for example, polyorganosiloxane-based and crosslinked acrylic resin-based thermosetting resin compositions. Usable as hard-coats that cure a material by use of optical energy are, for example, photocurable resin compositions produced by incorporating a photopolymerization initiator to a resin composition formed of a mono- and/or multi-functional acrylate monomer and/or oligomer.

According to the present invention, an example of hard-coat that cures a material by use of thermal energy and is to coat the high hardness layer is a thermosetting resin composition produced as follows. 100 parts by mass of organotrialkoxysilane, and 50 to 200 parts by mass of colloidal silica solution containing 10 to 50% by mass of colloidal silica having a particle diameter of 4 to 20 nm, are used to form a resin composition. To 100 parts by mass of this resin composition, 1 to 5 parts by mass of amine carboxylate and/or quaternary ammonium carboxylate is added.

According to the present invention, an example of hard-coat that cures a material by use of optical energy and is to coat the high hardness layer is a photocurable resin composition produced as follows. 40 to 80% by mass of tris (acloxyethyl)isocyanurate, and 20 to 60% by mass of bifunctional and/or trifunctional (meth)acrylate compound copolymerizable with tris(acloxyethyl)isocyanurate, are used to form a resin composition. To 100 parts by mass of this resin composition, 1 to 10 parts by mass of photopolymerization initiator is added.

According to the present invention, an example of hard-coat that cures a material by use of optical energy and is to coat the substrate layer is a photocurable resin composition produced as follows. 20 to 60% by mass of 1,9-nonanedioldiacrylate and 40 to 80% by mass of compound formed of the following materials and copolymerizable with 1,9-nonanedioldiacrylate are used to form a resin composition: at least bifunctional, namely, multi-functional (meth)acrylate monomer, and at least bifunctional, namely, multi-functional urethane (meth)acrylate oligomer and/or at least bifunctional, namely, multi-functional polyester (meth)acrylate oligomer and/or at least bifunctional, namely, multi-functional epoxy (meth)acrylate oligomer. To 100 parts by mass of the resin composition, 1 to 10 parts by mass of photopolymerization initiator is added.

According to the present invention, there is no specific limitation on the method for applying a hard-coat, and any known method is usable. Usable methods include, for example, a spin coat method, a dipping method, a spray method, a slide coat method, a bar coat method, a roll coat method, a gravure coat method, a meniscus coat method, a flexographic printing method, a screen printing method, a beat coat method, a brush method and the like.

In order to improve the adhesiveness of the hard-coat, the surface to be coated is occasionally pre-treated before being coated. Usable known methods of pre-treatment include, for example, a sandblast method, a solvent treatment method, a corona discharge treatment method, a chromic acid treatment method, a flame treatment method, a hot air treatment method, an ozone treatment method, an ultraviolet treatment method, a primer treatment method by use of a resin composition, and the like.

Preferably, the materials of the high hardness layer, the substrate layer and the hard-coat used in the present invention are filtrated to be refined. In the case where these materials are generated or laminated by use of a filter, a synthetic resin laminate having little external drawbacks such as attachment of foreign objects or defects can be provided. There is no specific limitation on the method for filtration. For example, a melt filtration method, a solution filtration or a combination thereof is usable.

There is no specific limitation on the filter to be used. Any known filter is usable. A filter to be used may be optionally selected in accordance with the use temperature, the viscosity and the filtering precision of each material. There is no specific limitation on the material of the filter. Usable materials include polypropylene, cotton, polyester, non-woven fabric of viscose rayon or glass fiber, roll of roving yarn, phenolic resin-impregnated cellulose, metal fiber non-woven sintered body, metal powder sintered body, breaker plate, and a combination thereof. In consideration of heat resistance, durability and pressure resistance, metal fiber non-woven sintered body is especially preferable.

The filtering precision for the resin (A) and the polycarbonate (B) is 50 μm or less, preferably 30 μm or less, and more preferably 10 μm or less. The filtering precision for the hard-coat is 20 μm or less, preferably 10 μm or less, and more preferably 5 μm or less because the hard-coat is applied to the outermost layer of the synthetic resin laminate plate.

For filtrating the resin (A) and the polycarbonate (B), it is preferable to use, for example, a polymer filter usable for performing melt filtration of a thermoplastic resin. Polymer filters are classified by the structure into a leaf disc filter, a candle filter, a pack disc filter, a cylindrical filter and the like. A leaf disc filter having a large effective filtration area is especially preferable.

According to the present invention, one or both of two surfaces of the synthetic resin laminate may be subjected to at least one of a reflection preventive treatment, an antifouling treatment, an antistatic treatment, a climate-proof treatment, and an anti-glare treatment. There is no specific limitation on the method for the reflection preventive treatment, the antifouling treatment, the antistatic treatment, the climate-proof treatment, or the anti-glare treatment. Any known method is usable. Usable methods include, for example, a method of applying a reflection reducing coat, a method of vapor-depositing a dielectric thin film, a method of applying an antistatic coat and the like.

EXAMPLES

Hereinafter, the present invention will be specifically described by way of examples. The present invention is not limited to these examples in any way.

The properties of laminate resins obtained in production examples were measured as follows, and synthetic resin laminates obtained in examples and comparative examples were evaluated as follows.

<Weight-Average Molecular Weight>

Standard polystyrene was dissolved in chloroform and subjected to measurement performed by gel permeation chromatography (GPC) in advance. The resultant standard curve was used as the reference. A (meth)acrylate copolymer and a polycarbonate resin were subjected to measurement performed by GPC in a similar manner. By comparing the results, the weight-average molecular weights of the (meth) acrylate copolymer and the polycarbonate resin were calculated. The GPC device used was as follows.

Device: Wates 2690
Column: Shodex GPC KF-805L; 8ϕ×300 mm; two coupled columns
Developing solvent: chloroform
Flow rate: 1 ml/min.
Temperature: 30° C.
Detector: UV . . . 486 nm polycarbonate
RI . . . special acrylic resin <Water Absorption Ratio>

In conformity with the JIS-K7209 A method, the water absorption ratio was measured. First, test pieces having a size of 60 mm×60 mm×1.0 mm were created by press molding. The test pieces were put into an oven of 50° C. to be dried. 24 hours later, the test pieces were taken out from the oven and cooled in a desiccator adjusted to have a temperature of 23° C. One hour later, the weight of each test piece was measured, and then the test pieces were put into water of 23° C. 24 hours later, the test pieces were taken out from the water, moisture on the surface of each test piece was wiped out, and then the weight of each test piece was measured. Regarding each test piece, the difference between the weight after the test piece was put into the water and the weight immediately after the test piece was dried was obtained, and the different was divided by the weight immediately after the test piece was dried. The resultant value was multiplied by 100. In this manner, the water absorption ratio was found.

<High-Temperature High-Humidity Exposure Test>

Each of test pieces was cut out to have a size of 10×6 cm. The test piece was set in a holder supported at two positions, and kept in an environmental tester, set to a temperature of 23° C. and a relative humidity of 50%, for 24 hours to be adjusted in terms of the state. Then, warp was measured (pre-treatment warping amount). Next, the test piece was set in the holder, put into an environmental tester set to a temperature of 85° C. and a relative humidity of 85%, and kept for 120 hours in this state. The holder accommodating the test piece was moved into an environmental tester set to a temperature of 23° C. and a relative humidity of 50%, and kept for 4 hours in this state. Then, the warp was measured again (post-treatment warping amount). The warp was measured as follows. The test piece taken out from the holder was kept still in a horizontal state with a protruding part directed upward and scanned at an interval of 1 mm by use of a three-dimensional shape meter equipped with an electric stage. The protruding part at the center was measured as warp. The value of (post-treatment warping amount)−(pre-treatment warping amount) was set as the shape stability.

<Pencil Hardness Test>

In conformity with JIS K 5600-5-4, a pencil was pressed to a surface of the resin (A) at an angle of 45 degree with respect to the surface and at a load of 750 g. The hardness of the pencil was gradually increased. The maximum hardness of the pencil which did not leave a scratch was set as the pencil hardness.

Synthesis Example 1

Production of Polycarbonate (a2)

Synthesis of copolymer polycarbonate of 2,2-bis(4-hydroxyl-3-methylphenyl)propane/2,2-bis(4-hydroxylphenyl)propane=6/4

6174.7 g (24.12 mol) of 2,2-bis(4-hydroxyl-3-methylphenyl)propane (produced by Honshu Chemical Industry Co., Ltd.), 4086 g (17.98 mol) of 2,2-bis(4-hydroxylphenyl) propane (produced by Nippon Steel Chemical Co., Ltd.; hereinafter, referred to simply as "BPA"), 3.8 g of triethylbenzyl ammonium chloride, and 50.0 g of hydrosulfite were dissolved in 54.5 L of aqueous solution of 9.0 w/w % sodium hydroxide.

24 L of methylene chloride was added to the resultant substance while being stirred, and 5390 g of phosgene was blown thereinto over 40 minutes while the temperature was kept at 15° C.

After the process of blowing phosgene was finished, 190 g of p-t-butylphenol was added and vigorously stirred to emulsify the reaction liquid. After the emulsification, 110 ml of triethylamine was added, and the substances were stirred for about one hour at a temperature of 20 to 25° C. to cause polymerization.

After the polymerization process was finished, the reaction liquid was divided into a water phase and an organic phase. The organic phase was neutralized with phosphoric acid, and was washed with water repeatedly until the conductivity of the previous liquid (water phase) was decreased down to 10 μS/cm or less. The resultant polymer solution was dripped into warm water kept at 62° C., and the solvent was evaporated to be removed. Thus, a white powdery precipitate was obtained. The obtained precipitate was filtrated and dried at 120° C. for 24 hours. As a result, the intended polycarbonate polymer powder composed of 60% by mass of the constituent unit represented by formula [2] and 40% by mass of the constituent unit represented by formula [3] was obtained. The weight-average molecular weight of the resultant polycarbonate was 33,000.

Production Example 1

Production of Resin (a11) Pellet

40% by mass of Metablen H-880 (produced by Mitsubishi Rayon Co., Ltd.; weight-average molecular weight: 14,000; a11/a12=33/66) as the (meth)acrylate copolymer (a1) and 60% by mass of the polycarbonate polymer of synthesis example 1 were put into a blender and mixed for 20 minutes. Then, the mixture was melt and kneaded at a cylinder temperature of 260° C. by use of a biaxial extruder having a screw diameter of 35 mm. The resultant substance was extruded into a strand and pelletized by a pelletizer. Pellets were produced stably.

Production Example 2

Production of Resin (a12) Pellet

25% by mass of the (meth)acrylate copolymer used in production example 1 and 75% by mass of the polycarbonate polymer of synthesis example 1 were mixed and pelletized. The pelletization was performed under substantially the same conditions as those of production example 1. Pellets were produced stably.

Production Example 3

Production of Photocurable Resin Composition (F1) to be Used to Coat the High Hardness Layer A composition of 60 parts by mass of tris(2-acroxyethyl) isocyanurate (produced by Aldrich), 40 parts by mass of neopentylglycololigoacrylate (produced by Osaka Organic Chemical Industry Ltd.; trade name: 215D), 1 part by mass of 2,4,6-trimethylbenzoyldiphenylphosphineoxide (produced by Ciba Japan K.K.; trade name: DAROCUR TPO), 0.3 parts by mass of 1-hydroxycyclohexylphenylketone (produced by Aldrich), and 1 part by mass of 2-(2H-benzotriazole-2-yl)-4,6-bis(1-methyl-1-phenylethyl)phenol (produced by Ciba Japan K.K.; trade name: TINUVIN 234) was introduced into a mixing bath equipped with a stirring blade, and stirred for 1 hour while being kept at 40° C. As a result, a photocurable resin composition (F1) was obtained.

Production Example 4

Production of Photocurable Resin Composition (F2) to be Used to Coat the Substrate Layer A composition of 40 parts by mass of 1,9-nonanedioldiacrylate (produced by Osaka Organic Chemical Industry Ltd.; trade name: Biscoat #260), 40 parts by mass of hexafunctional urethane acrylate oligomer (produced by Shin-Nakamura Chemical Co., Ltd.; trade name: U-6HA), 20 parts by mass of condensate containing succinic acid/trimethylolethane/acrylic acid at a molar ratio of 1/2/4, 2.8 parts by mass of 2,4,6-trimethylbenzoyldiphenylphosphineoxide (produced by Ciba Japan K.K.; trade name: DAROCUR TPO), 1 part by mass of benzophenone (produced by Aldrich), and 1 part by mass of 2-(2H-benzotriazole-2-yl)-4,6-bis(1-methyl-1-phenylethyl)phenol (produced by Ciba Japan K.K.; trade name: TINUVIN 234) was introduced into a mixing bath equipped with a stirring blade, and stirred for 1 hour while being kept at 40° C. As a result, a photocurable resin composition (F2) was obtained.

Comparative Production Example 1

Production of Resin (A2) Pellet

Only the polycarbonate (a2) of synthesis example 1 was used to produce pellets. The pelletization was performed in substantially the same manner as in production example 1. Pellets were produced stably.

Example 1

A synthetic resin laminate was produced by use of a multi-layer extrusion device including a monoextruder having a shaft diameter of 40 mm, a monoextruder having a shaft diameter of 75 mm, and a multi-manifold die coupled to the extruders. The resin (A11) obtained in production example 1 was continuously introduced into the monoextruder having a shaft diameter of 40 mm and extruded under the conditions of a cylinder temperature of 240° C. and a dispensing rate of 4.0 kg/h. A polycarbonate resin (B1) (produced by Mitsubishi Engineering-Plastics Corporation; trade name: Iupilon S-1000; weight-average molecular weight: 33,000) was continuously introduced into the monoextruder having a shaft diameter of 75 mm and extruded under the conditions of a cylinder temperature of 270° C. and a dispensing rate of 63.0 kg/h. The resins extruded from the extruders were laminated in the multi-manifold and extruded from the T-die in the form of a sheet. Three mirror-finish rolls respectively having temperatures of 130° C., 120° C. and 190° C. from the upstream side were provided. The sheet was cooled while the mirror surfaces of the mirror-finish rolls were transferred thereto. As a result, a laminate (E1) of (A11) and (B1) was obtained. The resultant laminate had a total thickness of 1.0 mm, and the layer formed of (A11) had a thickness of 60 µm in a central part thereof. The result of the high-temperature high-humidity exposure test was 9 µm, and the result of the pencil hardness test was 2H.

Example 2

A laminate (E2) of (A11) and (B1) was obtained in substantially the same manner as in example 1 except that the dispensing rate of the monoextruder having a shaft diameter of 40 mm was 7.0 kg/h and that the dispensing rate of the monoextruder having a shaft diameter of 75 mm was 60.0 kg/h. The resultant laminate had a total thickness of 1.0 mm, and the high hardness layer formed of (A11) had a thickness of 110 µm in a central part thereof. The result of the high-temperature high-humidity exposure test was 14 µm, and the result of the pencil hardness test was 2H.

Example 3

The photocurable resin composition (F1) obtained in production example 3 was applied to the high hardness layer formed of (A11), in the laminate (E1) obtained in example 1, by use of a bar coater such that the post-curing thickness of the photocurable resin composition (F1) would be 3 to 8 µm. The resultant substance was coated with a PET film pressure-contacted thereto. The photocurable resin composition (F2) obtained in production example 4 was applied to the substrate layer formed of (B1) by use of a bar coater such that the post-curing thickness of the photocurable resin composition (F2) would be 3 to 8 µm. The resultant substance was coated with a PET film pressure-contacted thereto. The resultant laminate was irradiated and thus cured with ultraviolet rays under the condition of a line speed of 1.5 m/min. by use of a conveyor equipped with a high voltage mercury lamp having a light source distance of 12 cm and an output of 80 W/cm. Thus, the PET films were delaminated. As a result, a laminate (E3) in which the high hardness layer and the substrate layer were respectively coated with the hard-coats formed of (F1) and (F2) was obtained. The result of the high-temperature high-humidity exposure test was 9 µm, and the result of the pencil hardness test was 4H.

Example 4

A laminate (E4) of (A12) and (B1) was obtained in substantially the same manner as in example 1 except that the resin (A12) was used instead of the resin (A11). The resultant laminate had a total thickness of 1.0 mm, and the high hardness layer formed of (A12) had a thickness of 60 µm in a central part thereof. The result of the high-temperature high-humidity exposure test was 40 µm, and the result of the pencil hardness test was H.

Example 5

A laminate (E5) of (A12) and (B1) was obtained in substantially the same manner as in example 4 except that the dispensing rate of the monoextruder having a shaft diameter of 40 mm was 7.0 kg/h and that the dispensing rate of the monoextruder having a shaft diameter of 75 mm was 60.0 kg/h. The resultant laminate had a total thickness of 1.0 mm, and the high hardness layer formed of (A12) had a thickness of 110 µm in a central part thereof. The result of the high-temperature high-humidity exposure test was 47 µm, and the result of the pencil hardness test was H.

Comparative Example 1

A laminate (E6) of (A2) and (B1) was obtained in substantially the same manner as in example 1 except that the resin (A2) was used instead of the resin (A12). The resultant laminate had a total thickness of 1.0 mm, and the high hardness layer formed of (A2) had a thickness of 60 µm in a central part thereof. The result of the high-temperature high-humidity exposure test was 34 µm, and the result of the pencil hardness test was F.

Comparative Example 2

A laminate (E7) of (A2) and (B1) was obtained in substantially the same manner as in comparative example 1 except that the dispensing rate of the monoextruder having a shaft diameter of 40 mm was 7.0 kg/h and that the dispensing rate of the monoextruder having a shaft diameter of 75 mm was 60.0 kg/h. The resultant laminate had a total thickness of 1.0 mm, and the high hardness layer formed of (A2) had a thickness of 110 µm in a central part thereof. The result of the high-temperature high-humidity exposure test was 27 µm, and the result of the pencil hardness test was F.

Comparative Example 3

A laminate (E8) of (A3) and (B2) was obtained in substantially the same manner as in example 1 except that a methylmethacrylate-styrene copolymer (A3) (produced by Nippon Steel Chemical Co., Ltd.; trade name: MS600) was used instead of the resin (A11), that a polycarbonate (B2) (produced by Mitsubishi Engineering-Plastics Corporation; trade name; Iupilon S-3000; mass-average molecular weight: 27,000) was used instead of the polycarbonate (B1), that the cylinder temperature of the monoextruder having a shaft diameter of 32 mm was 220° C., and that the temperatures of the rolls were 130° C., 140° C. and 190° C. from the upstream side. The resultant laminate had a total thickness of 1.0 mm, and the high hardness layer formed of (A3) had a thickness of 60 µm in a central part thereof. A laminate (E9) in which the high hardness layer and the substrate layer of the laminate (E8) were respectively coated with hard-coats formed of (F1) and (F2) was obtained in substantially the same manner as in example 3. The result of the high-temperature high-humidity exposure test was 400 µm, and the result of the pencil hardness test was 3H.

Comparative Example 4

A laminate (E10) of (A4) and (B1) was obtained in substantially the same manner as in example 1 except that a polymethylmethacrylate resin (A4) (produced by ARKEMA; trade name: ALTUGLAS V020) was used instead of the resin (A11) and that the temperatures of the rolls were 130° C., 130° C. and 190° C. from the upstream side. The resultant laminate had a total thickness of 1.0 mm, and the high hardness layer formed of (A4) had a thickness of 60 µm in a central part thereof. The result of the high-temperature high-humidity exposure test was 1020 µm, and the result of the pencil hardness test was 3H.

Comparative Example 5

A laminate (E11) of (A4) and (B2) was obtained in substantially the same manner as in comparative example 4 except that the polycarbonate (B2) was used instead of the polycarbonate (B1). The resultant laminate had a total thickness of 1.0 mm, and the high hardness layer formed of (A4) had a thickness of 60 pun in a central part thereof. The result of the high-temperature high-humidity exposure test was 1030 µm, and the result of the pencil hardness test was 3H.

Comparative Example 6

A laminate (E12) in which the high hardness layer formed of (A4) and the substrate layer formed of (B2) in the laminate (E11) obtained in comparative example 5 were respectively coated with hard-coats formed of (F1) and (F2) was obtained in substantially the same manner as in example 3. The result of the high-temperature high-humidity exposure test was 1200 µm, and the result of the pencil hardness test was 4H.

As can be seen from the examples and the comparative examples, a resin laminate according to the present invention, in which a resin layer (high hardness layer) that contains a polycarbonate containing a constituent unit represented by formula [2] above and also contains a specific (meth)acrylate copolymer is laminated on a polycarbonate substrate layer, is superior in surface hardness and size stability in high-temperature high-humidity environments than resin laminates in comparative examples in which a polycarbonate resin containing the constituent unit represented by formula [2] above is laminated on a polycarbonate substrate layer. In addition, the resin laminate according to the present invention is superior in shape stability in high-temperature high-humidity environments than resin laminates in comparative examples in which a (meth)acrylate copolymer is laminated on a polycarbonate substrate layer.

As can seen from Tables 1 and 2, a synthetic resin laminate according to the present invention is excellent in shape stability in high-temperature high-humidity environments, surface hardness, impact resistance, climate resistance and heat resistance.

TABLE 1

| Example | Produced resin Symbol | (Meth)acrylate copolymer (a1) [Mass %] | Polycarbonate (a2) [Mass %] | Water absorption ratio/% JIS K 7209 24 hr. in 23° C. water | Pellet production Possible |
|---|---|---|---|---|---|
| Production example 1 | A11 | Metablen H-880 [40%] | Copolymer of 2,2-bis(4-hydroxy-3-methylphenyl)propane/2,2-bis(4-hydroxyphenyl)propane = 6/4 [60%] | 0.33% | Possible |
| Production example 2 | A12 | Metablen H-880 [25%] | Copolymer of 2,2-bis(4-hydroxy-3-methylphenyl)propane/2,2-bis(4-hydroxyphenyl)propane = 6/4 | 0.28% | Possible |

TABLE 1-continued

| Example | Produced resin Symbol | (Meth)acrylate copolymer (a1) [Mass %] | Polycarbonate (a2) [Mass %] | Water absorption ratio/% JIS K 7209 24 hr. in 23° C. water | Pellet production Possible |
|---|---|---|---|---|---|
| Comparative production example 1 | A2 | — | [75%] Copolymer of 2,2-bis(4-hydroxy-3-methylphenyl)propane/2,2-bis(4-hydroxyphenyl)propane = 6/4 | 0.2% | Possible |
| Reference example 1 | A3 | [100%] Methylmethacrylate-styrene copolymer: MS600 | | 0.51% | Commecially available |
| Reference example 2 | A4 | Poly(methyl methacrylate): V020 | | 0.80% | Commecially available |
| Reference example 3 | B1 | | Polycarbonate: Iupilon S-1000 | 0.29% | Commecially available |
| Reference example 4 | B2 | | Polycarbonate: Iupilon S-3000 | 0.29% | Commecially available |

TABLE 2

| Example | (A) material [thickness] μm | (B) material [thickness] μm | (A) surface hard-coat | (B) surface hard-coat | Laminate | Shape stability in high-temperature high-humidity environments [Shape change amount/μm] | (A) surface pencil hardness |
|---|---|---|---|---|---|---|---|
| Example 1 | A11 [60] | B1 [940] | None | None | E1 | 9 μm | 2H |
| Example 2 | A11 [110] | B1 [890] | None | None | E2 | 14 μm | 2H |
| Example 3 | A11 [60] | B1 [940] | F1 | F2 | E3 | 9 μm | 4H |
| Example 4 | A12 [60] | B1 [940] | None | None | E4 | 40 μm | H |
| Example 5 | A12 [110] | B1 [890] | None | None | E5 | 47 μm | H |
| Comparative example 1 | A2 [60] | B1 [940] | None | None | E6 | 34 μm | F |
| Comparative example 2 | A2 [110] | B1 [890] | None | None | E7 | 27 μm | F |
| Comparative example 3 | A3 [60] | B2 [940] | F1 | F2 | E9 | 400 μm | 3H |
| Comparative example 4 | A4 [60] | B1 [940] | None | None | E10 | 1020 μm | 3H |
| Comparative example 5 | A4 [60] | B2 [940] | None | None | E11 | 1030 μm | 3H |
| Comparative example 6 | A4 [60] | B2 [940] | F1 | F2 | E12 | 1200 μm | 4H |

INDUSTRIAL APPLICABILITY

A synthetic resin laminate according to the present invention has a feature of being excellent in shape stability in high-temperature high-humidity environments, surface hardness, impact resistance, climate resistance and heat resistance, and is preferably usable as a transparent substrate material, a transparent protection material or the like, especially for front plates of display sections of information appliances and mobile electronic devices, substrates of touch panels and sheets for heat bending.

The invention claimed is:
1. A synthetic resin laminate, which is obtained by laminating a resin layer containing a resin (A) that contains a (meth)acrylate copolymer (a1) and a polycarbonate (a2) on one surface or both surfaces of a substrate layer containing a polycarbonate (B),
wherein the (meth)acrylate copolymer (a1) is a (meth)acrylate copolymer composed of 5 to 80% by mass of an aromatic (meth)acrylate unit (a11) and 20 to 95% by mass of a methyl methacrylate unit (a12),
the ratio of the (meth)acrylate copolymer (a1) with respect to the resin (A) is 5 to 55% by mass, and the ratio of the polycarbonate (a2) with respect to the resin (A) is 95 to 45% by mass and
the polycarbonate (a2) is a polycarbonate homopolymer or copolymer consisting of 20 to 100% by mass of a constituent unit represented by the following formula [2]:

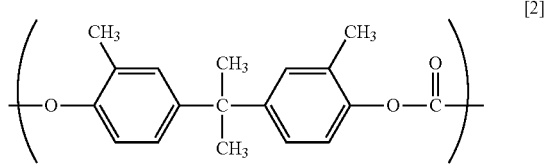

and 80 to 0% by mass of a constituent unit represented by the following formula [3]:

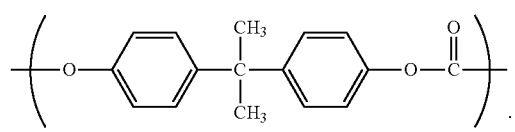

2. The synthetic resin laminate according to claim 1, wherein the resin (A) is composed of 5 to 55% by mass of the (meth)acrylate copolymer (a1) having a weight-average molecular weight of 5,000 to 30,000 and 95 to 45% by mass of the polycarbonate (a2) having a weight-average molecular weight of 21,000 to 40,000.

3. The synthetic resin laminate according to claim 1, wherein the resin layer containing the resin (A) has a thickness of 10 to 250 µm, the synthetic resin laminate has a total thickness of 0.1 to 2.0 mm, and the thickness ratio of the resin layer/synthetic resin laminate is 0.01 to 0.5.

4. The synthetic resin laminate according to claim 1, wherein the polycarbonate (B) has a weight-average molecular weight of 18,000 to 40,000.

5. The synthetic resin laminate according to claim 1, wherein the resin layer and/or the substrate layer contains an ultraviolet absorber.

6. The synthetic resin laminate according to claim 1, wherein the resin layer containing the resin (A) is hard-coated.

7. The synthetic resin laminate according to claim 1, wherein the resin layer containing the resin (A) is provided on only one surface of the substrate layer containing the polycarbonate (B), and the resin layer containing the resin (A) and the substrate layer containing the polycarbonate (B) are hard-coated.

8. The synthetic resin laminate according to claim 1, wherein one surface or both surfaces of the synthetic resin laminate is obtained as a result of at least one of a reflection preventive treatment, an antifouling treatment, an anti-fingerprint treatment, an antistatic treatment, a climate-proof treatment, and an anti-glare treatment.

9. A transparent substrate material, comprising the synthetic resin laminate according to claim 1.

10. A transparent protection material, comprising the synthetic resin laminate according to claim 1.

* * * * *